3,235,423
STABILIZED AQUEOUS SLURRY BLASTING AGENT AND PROCESS

John D. Ferguson, Rockaway, N.J., assignor to Hercules Powder Company, Wilmington, Del., a corporation of Delaware
No Drawing. Filed Mar. 24, 1964, Ser. No. 354,447
10 Claims. (Cl. 149—38)

This invention relates to a novel aqueous slurry blasting agent and to a method for its preparation. More particularly, the present invention relates to a gelled aqueous slurry blasting agent having improved properties in respect to stability when particulate aluminum is present.

The art for the manufacture of gelled aqueous slurry explosives or blasting agents is well known. Also, it is well known that gelled aqueous slurries containing aluminum present problems in respect to stability in storage. Gelled aluminized aqueous slurries at normal storage (80° F.) and elevated temperatures (120° F.) begin to deteriorate after several days. The gel begins to break down, syneresis occurs (exuding of water from the gel), and gassing occurs until after a short time, the gel is completely broken, and the ingredients become segregated. Thus, it is necessary to inhibit the aluminum with chemical stabilizers, and, for example, phosphate inhibitors employed in small amount have been found useful for this purpose. Moreover, it is known to formulate aqueous slurries to better accommodate low temperature utility by balancing water, ammonium nitrate and sodium nitrate in a three-component system. Sodium nitrate is known as a freezing point depressant and has been employed in formulating compositions likely to be used under freezing temperature conditions. However, at best, the eutectic point for the three-component system is such that the slurry freezes at about −14° F. Accordingly, a principal object of the present invention is to provide gelled aqueous blasting agents containing aluminum which are remarkably stable over long periods of storage and, in addition, are utilizable under temperature conditions heretofore deemed too low for practical application.

Still another object of the invention is to provide a process for manufacture of the aforementioned blasting agents in a facile and economical manner wherein the solid ingredients of the compositions are intimately incorporated and uniformly suspended.

Other objects of the invention will appear hereinafter, the novel features and combinations being set forth in the appended claims.

Generally described, the present invention contemplates the preparation of a gelled aqueous slurry blasting agent comprising a sensitizing agent; an inorganic nitrate oxidizing salt; particulate aluminum; guar gum gelling agent; water; and not more than about 18% by weight of ethylene glycol as a stabilizer at a pH of from about 5 to about 7 for the final composition.

The examples given in the following table will serve to illustrate the compositions of the invention as well as their method of preparation. All parts and percentages are by weight.

Table

| Example | 1 | 2 | 3 | 4 | 5 | 6 | 7 | 8 |
|---|---|---|---|---|---|---|---|---|
| Water, percent | 21.0 | 21.0 | 16.0 | 16.0 | 18.0 | 20.0 | 16.0 | 15.0 |
| Smokeless Powder: | | | | | | | | |
| 1.1″ Sgle. Base [a] | | | | 30.0 | 30.0 | 35.0 | | |
| 40 mm. Sgle. Base [b] | 25.0 | 25.0 | | | | | 35.0 | |
| 20 mm. Sgle. Base [c] | | | | | | | | 35.0 |
| TNT all through 20 mesh | | | 20.0 | | | | | |
| Ammonium Nitrate: | | | | | | | | |
| Prills [d] | 19.3 | 17.1 | | | 15.0 | 24.3 | | |
| Grained [e] | | | 38.1 | 30.2 | | | 15.9 | 8.9 |
| Sodium Nitrate: | | | | | | | | |
| Fine [f] | | | 9.0 | 7.0 | 14.8 | | 8.0 | 8.0 |
| Coarse [g] | 16.0 | 14.3 | | | | 15.3 | | |
| Guar Gum [h]: | | | | | | | | |
| [i] | 0.6 | 0.6 | | | | | | |
| [j] | | | 1.3 | 1.2 | | 0.8 | | |
| [k] | | | | | 0.4 | | 1.0 | 1.0 |
| Aluminum [l] | 14.0 | 18.0 | 14.0 | 14.0 | 18.0 | | 14.0 | 14.0 |
| Pine Oil | 0.1 | 0.1 | 0.1 | 0.1 | 0.1 | 0.1 | 0.1 | 0.1 |
| Ethylene Glycol | 4.0 | 3.9 | 1.5 | 1.5 | 3.7 | 4.5 | 10.0 | 18.0 |
| Acetic Acid | trace | trace | trace | trace | trace | trace | trace | trace |
| pH | 4.8 | 5.2 | 5.8 | 6.0 | 6.6 | 5.4 | 6.0 | 6.6 |
| Density (gm./cc.) | 1.44 | 1.43 | 1.42 | 1.46 | 1.47 | 1.41 | 1.4 | 1.4 |
| Shooting Results (3″ x 28″ pipe under water) m./sec.: | | | | | | | | |
| 160 gm. booster [m] | 5,080 | 4,850 | 5,000 | 5,240–5,000 | 5,240 | 5,250 | | |
| 80 gm. booster [m] | Failed | | | | | | | |
| 40 gm. booster [m] | | Failed | 5,080 | | | | | |
| 20 gm. booster [n] | | | 4,780 | | 4,930 | 5,900 | 5,500 | 5,500 |
| 10 gm. booster [n] | | | Failed | | Failed | Failed | | |
| Approx. Freezing Point, °F | −25 | −25 | −15 | −15 | −25 | −30 | | |
| Results of Storage | | | | [o] | | | [p] | [q] |
| Mixing Procedure (numbered stepwise). | (1) Add water, Pine Oil Glycol; (2) Pregel ½ Guar Gum with small amt. ingredients—1 to 2 minutes; (3) Add ingredients and Guar Gum; (4) Add Smokeless Powder Alum. (adjust pH to 5.5 w./acid). | | (1) Add water and Pine Oil; (2) Add ⅓ Guar Gum and 0.1 ingredients—Pregel 1–2 minutes; (3) Add Glycol; (4) Add remaining ingredients—Add acid; (5) Add Smokeless Powder or TNT; (6) Add Aluminum; (7) Add remaining Guar Gum—mix 1 minute. | | Mixing Procedure same as Examples 1 and 2. | (1) Add water, Pine Oil, Glycol; (2) Add Guar Gum and Prills-gel; (3) Add Soda; (4) Add Smokeless Powder. | (1) Add water, Glycol, Pine Oil; (2) Add Guar Gum with small amt. ingredients—gel; (3) Add remaining ingredients and Smokeless Powder. | |

[a] Length 0.1″, width 0.04″, perforations—1.
[b] Length 0.1″, width 0.12″, perforations—7.
[c] Length 0.3″, width 0.08″, perforations—1.
[d] All on 20 mesh.
[e] <5% on mesh (contains 0.11% zinc oxide).
[f] <7% on 20 mesh.
[g] All on 20 mesh.
[h] >99% through 60 mesh.
[i] Inhibited < (j), self-complexing.
[j] Inhibited, self-complexing.
[k] Noninhibited, nonself-complexing.
[l] All through 5 mesh.
[m] 59.5 RDX, 39.5 TNT, 1.0 wax.
[n] PETN.
[o] Stored 6 wks. at 120° F.—no sign of deterioration.
[p] Soft and flowable at −40° F. after 36 hours.
[q] Soft and flowable at −60° F. after 36 hours.

With reference to the foregoing table, it will be seen that the aluminized products were remarkably stable and, in addition, were adjustable to accommodate extremely low temperature requirements. Also, it will be seen that in preparation of the products, a viscous sol of guar gum gelling agent, water and ethylene glycol was first formed, that practically all the particulate solid blasting ingredients including the aluminum were suspended therein and that the final blasting agent composition was controlled to have a pH of from about 5 to about 7 by ingredient selection, by in process adjustment of pH, by end product adjustment of pH or a combination of these procedures. The pine oil was added as a defoamer to increase the density of the composition, and the initial addition of a small amount of the solid ingredients in the mix served to aid in dispersing the guar gum and prevent lumping.

Moreover, with reference to the table, the physical nature and consistency of the blasting agents set forth will vary somewhat depending upon the precise formulation in each instance. This, of course, is generally advantageous since it permits "tailoring" of the compositions to fit conditions for use in the field. It will be appreciated that field conditions may dictate the addition of ingredients such as sulfur, ferrosilicon, ferrophosphorous and the like, which are well known in the art and contemplated within the purview of the invention. Generally speaking, however, aqueous slurry blasting agents in accordance with the prior art become quite firm and lose their flow properties at about 0° F. and tend to freeze at temperatures about −14° F. In contrast thereto, the gelled aqueous slurry blasting agents according to the invention may be formulated to retain their flow properties at temperatures as low as −60° F. and as Example 8 demonstrates, the composition containing 18% ethylene glycol was soft and flowable and not frozen after 36 hours' storage at −60° F. Also, as Example 4 demonstrates, the blasting agent of the invention after being stored for six weeks at 120° F. showed no sign of deterioration. In all instances, extremely stable products were obtained.

The sensitizing agents which may be used in accordance with the present invention include smokeless powder, TNT, RDX, PETN, Pentolite, Cyclotol, HBX and the like. These materials may be pelleted, flaked or grained.

The inorganic nitrate oxidizing salt is ammonium nitrate and/or sodium nitrate, which are used as strength and/or oxygen donors for the compositions. The salts are used in an amount of from about 10 to about 50 percent and from about 5 to about 30 percent and preferably from about 10 to about 40 percent and preferably from about 5 to about 20 percent, respectively.

The guar gum is a galactomannan substance and may be of the inhibited or uninhibited, and self-complexing, types with the gum present in an amount of from about 0.2 to about 5% and preferably from about 0.2 to about 2%.

The water content of the compositions is important in determining the consistency, the amount of solution in the formula (which controls freezing characteristics), and the amount of ethylene glycol to be added to the composition. Consistency of the product is important for economical packaging, and for proper use of the slurry in blasting. The softness of consistency is greatly dependent on the solid to liquid ratio, and, therefore, the percent water in the mix. The amount of water present may be from about 8 to about 30% and preferably from about 10 to about 25%.

For proper functioning of ethylene glycol in its additional role as a freezing point depressant, it is generally used in an amount of about 9% of the ammonium nitrate/sodium nitrate/water solution in the mix. This percentage forms the optimum system for consistency, effect of ethylene glycol on the gelation of the guar gum, and the explosive energy. Preferably, however, the ethylene glycol is utilized in an amount of from about 1 to about 5%. Ethylene glycol has been used, however, in amounts up to 18% where extremely low temperatures are to be accommodated as shown in the examples.

The percentage of aluminum used is determined by the strength desired in the ultimate composition. The aluminum may be varied in amount from about 2 to about 40%, and preferably is present in an amount of from about 5 to about 20%.

The pH of the compositions is adjusted with acid when necessary. For this purpose, acetic acid or nitric acid are generally used, but other acids and buffer salts can be used. A pH of from about 5 to about 7 has been found essential to obtain stability over long periods of storage for the compositions of this invention.

The method of addition of ingredients is set forth in the table. The most important steps in the procedure are the initial addition of guar gum and the time of addition of the ethylene glycol. A portion of the guar gum should be added to the water and hydrated before the solid ingredients are added. This forms a sol of sufficient viscosity to suspend the solid ingredients. Ethylene glycol consistently should be added before the salts so that proper dispersal of the ethylene glycol in water will take place.

The advantages of the invention are multifold. The ethylene glycol stabilizes the aluminized compositions for extended periods of storage at elevated temperatures and at ambient temperatures. For example, the composition of Example 2 has been in storage for one year at ambient temperatures without any sign of deterioration. Furthermore, the presence of ethylene glycol lowers the freezing point of the compositions with the additional advantage of being able to utilize substantial amounts of the glycol without disrupting the stability characteristics of the compositions. Thus, soft, usable products at temperatures as low as −60° F. are obtainable. Still further, ethylene glycol used with guar gum does not inhibit its gelation characteristics and can be used as a dispersing agent for the guar gum. This gives a homogeneous mixing of the guar gum without lumping, which is quite advantageous for mixing of the ingredients.

It will be seen, therefore, that this invention may be carried out by the use of various modifications and changes without departing from its spirit and scope with only such limitations placed thereon as are imposed by the appended claims.

What I claim and desire to protect by Letters Patent is:
1. A gelled aqueous slurry blasting agent comprising
  (a) a sensitizing agent;
  (b) an inorganic nitrate oxidizing salt;
  (c) from about 2 to about 40% of particulate aluminum;
  (d) guar gum gelling agent;
  (e) water; and
  (f) from about 1 to about 18% by weight of ethylene glycol as a stabilizer at a pH of from about 5 to about 7 for the final blasting agent.
2. A gelled aqueous slurry blasting agent comprising by weight
  (a) from about 10 to about 40% of a sensitizing agent;
  (b) from about 10 to about 50% of ammonium nitrate;
  (c) from about 5 to about 30% of sodium nitrate;
  (d) from about 0.2 to about 5% of guar gum gelling agent;
  (e) from about 2 to about 40% of particulate aluminum;
  (f) from about 8 to about 30% of water; and
  (g) from about 1 to about 5% of ethylene glycol as a stabilizer at a pH of from about 5 to about 7 for the final blasting agent composition.

3. A gelled aqueous slurry blasting agent comprising by weight
   (a) from about 20 to about 40% of a sensitizing agent;
   (b) from about 10 to about 40% of ammonium nitrate;
   (c) from about 5 to about 20% of sodium nitrate;
   (d) from about 0.2 to about 2% of guar gum gelling agent;
   (e) from about 5 to about 20% of particulate aluminum;
   (f) from about 10 to about 25% of water; and
   (g) from about 1 to about 5% of ethylene glycol as a stabilizer at a pH of from about 5 to about 7 for the final blasting agent composition.

4. The gelled aqueous slurry blasting agent of claim 2 in which the sensitizing agent is smokeless powder.

5. The gelled aqueous slurry blasting agent of claim 2 in which the sensitizing agent is TNT.

6. The gelled aqueous slurry blasting agent of claim 3 in which the sensitizing agent is smokeless powder.

7. The gelled aqueous slurry blasting agent of claim 3 in which the sensitizing agent is TNT.

8. In the process of manufacturing a stable aqueous slurry blasting agent containing aluminum, the improvement which comprises
   (a) forming a viscous sol of guar gum gelling agent, water and ethylene glycol,
   (b) suspending particulate solid blasting ingredients and aluminum in the viscous sol; and
   (c) controlling the pH to obtain a pH of from about 5 to about 7 for the final composition.

9. In the process of manufacturing a stable aqueous slurry blasting agent containing aluminum, the improvement which comprises
   (a) forming a viscous sol of guar gum gelling agent, water and ethylene glycol,
   (b) suspending a sensitizing agent, an inorganic nitrate oxidizing salt and particulate aluminum in the viscous sol; and
   (c) controlling the pH to obtain a pH of from about 5 to about 7 for the final composition.

10. In the process of manufacturing a stable aqueous slurry blasting agent containing aluminum, the improvement which comprises
   (a) forming a viscous sol of guar gum gelling agent, water and ethylene glycol,
   (b) suspending a sensitizing agent, ammonium nitrate, sodium nitrate and particulate aluminum in the viscous sol; and
   (c) controlling the pH to obtain a pH of from about 5 to about 7 for the final composition.

References Cited by the Examiner

UNITED STATES PATENTS

| | | | |
|---|---|---|---|
| 2,930,685 | 3/1960 | Cook et al. | 149—39 X |
| 3,011,883 | 12/1961 | Sagers | 149—38 |
| 3,113,059 | 12/1963 | Ursenbach et al. | 149—41 |
| 3,129,126 | 4/1964 | Carlevato | 149—41 X |
| 3,153,606 | 10/1964 | Breza et al. | 149—41 |
| 3,160,538 | 12/1964 | Zaslowsky | 149—44 X |

LEON D. ROSDOL, *Primary Examiner.*
BENJAMIN R. PADGETT, *Examiner.*